(12) United States Patent
Ito et al.

(10) Patent No.: US 9,970,693 B2
(45) Date of Patent: May 15, 2018

(54) REFRIGERATION CYCLE APPARATUS

(71) Applicant: Mitsubishi Electric Corporation, Tokyo (JP)

(72) Inventors: Daisuke Ito, Tokyo (JP); Takashi Okazaki, Tokyo (JP); Akira Ishibashi, Tokyo (JP); Shinya Higashiiue, Tokyo (JP); Shigeyoshi Matsui, Tokyo (JP); Yuki Ugajin, Tokyo (JP); Takumi Nishiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/120,807

(22) PCT Filed: Mar. 6, 2015

(86) PCT No.: PCT/JP2015/056717
§ 371 (c)(1),
(2) Date: Aug. 23, 2016

(87) PCT Pub. No.: WO2015/133622
PCT Pub. Date: Sep. 11, 2015

(65) Prior Publication Data
US 2016/0363354 A1    Dec. 15, 2016

(30) Foreign Application Priority Data
Mar. 7, 2014  (WO) .................. PCT/JP2014/056022

(51) Int. Cl.
*F25B 7/00*   (2006.01)
*F25B 39/00*   (2006.01)
(Continued)

(52) U.S. Cl.
CPC ................. *F25B 39/00* (2013.01); *F25B 1/00* (2013.01); *F25B 6/00* (2013.01); *F25B 6/02* (2013.01);
(Continued)

(58) Field of Classification Search
CPC ...... F25B 6/04; F25B 6/02; F25B 6/00; F25B 39/04; F25B 39/00; F25B 2341/0662;
(Continued)

(56) References Cited

U.S. PATENT DOCUMENTS

2005/0115260 A1* 6/2005 Yap ........................... F25B 1/10
                                                            62/238.6
2010/0107683 A1* 5/2010 MacBain .................. F25B 1/00
                                                            62/510
(Continued)

FOREIGN PATENT DOCUMENTS

CA      2575027 A1 * 8/2007 ........... B60H 1/3226
CN    101617181 A    12/2009
(Continued)

OTHER PUBLICATIONS

International Search Report of the International Searching Authority dated May 26, 2015 for the corresponding international application No. PCT/JP2015/056717 (and English translation).
(Continued)

*Primary Examiner* — Frantz Jules
*Assistant Examiner* — Joseph Trpisovsky
(74) *Attorney, Agent, or Firm* — Posz Law Group, PLC (57) ABSTRACT

A refrigeration cycle apparatus includes refrigerant circuits each configured to circulate a refrigerant of the same composition. The refrigerant circuit is provided with a radiator configured to condense the refrigerant to transfer heat to external fluid, and the refrigerant circuit is provided with a radiator configured to transfer heat to the external fluid while
(Continued)

allowing the refrigerant to be maintained in a supercritical state. The radiator is arranged upstream of the radiator in a direction of a flow of the external fluid. A capacity of a refrigerant flow channel of the radiator is smaller than a capacity of a refrigerant flow channel of the radiator.

6 Claims, 4 Drawing Sheets

(51) Int. Cl.
  *F25B 1/00* (2006.01)
  *F25B 6/04* (2006.01)
  *F25B 39/04* (2006.01)
  *F25B 6/02* (2006.01)
  *F25B 6/00* (2006.01)
  *F25B 41/04* (2006.01)

(52) U.S. Cl.
  CPC ............... *F25B 6/04* (2013.01); *F25B 39/04* (2013.01); *F25B 41/04* (2013.01); *F25B 2339/047* (2013.01); *F25B 2341/0662* (2013.01); *F25B 2400/06* (2013.01); *F25B 2500/23* (2013.01); *F25B 2600/111* (2013.01); *F25B 2600/2519* (2013.01); *Y02B 30/743* (2013.01)

(58) Field of Classification Search
  CPC .. F25B 2400/06; F25B 1/00; F25B 2339/047; F25B 2500/23; Y02B 30/743
  USPC .......................................................... 62/335
  See application file for complete search history.

(56) References Cited

U.S. PATENT DOCUMENTS

| | | | | |
|---|---|---|---|---|
| 2010/0121495 | A1* | 5/2010 | Okoren | F25B 25/005 700/282 |
| 2010/0313578 | A1* | 12/2010 | Robidou | F17C 9/02 62/50.2 |
| 2013/0180278 | A1* | 7/2013 | Yamashita | F25B 6/04 62/335 |
| 2013/0227979 | A1 | 9/2013 | Kasuka et al. | |
| 2013/0319036 | A1* | 12/2013 | Taras | F25B 1/10 62/434 |

FOREIGN PATENT DOCUMENTS

| | | | |
|---|---|---|---|
| JP | 10-176867 A | 6/1998 | |
| JP | 2004-190922 A | 7/2004 | |
| JP | 2005-214525 A | 8/2005 | |
| JP | 2005-337626 A | 12/2005 | |
| JP | 2006-242480 A | 9/2006 | |
| JP | 2007-183078 A | 7/2007 | |
| JP | 2007-198693 A | 8/2007 | |
| JP | 2008-267722 A | 11/2008 | |
| JP | 2009-024884 A | 2/2009 | |
| JP | 2009-222246 A | 10/2009 | |
| JP | 2009-243740 A | 10/2009 | |
| JP | 2012-184893 A | 9/2012 | |
| WO | WO 2005124221 A1 * | 12/2005 | ............... F17D 1/18 |
| WO | 2012/157764 A1 | 11/2012 | |
| WO | 2014/123120 A1 | 8/2014 | |

OTHER PUBLICATIONS

Office Action dated Feb. 5, 2018 issued in corresponding CN patent application No. 201580012408.3 (and English translation thereof).
Extended European Search Report dated Mar. 9, 2018 issued in corresponding EP patent application No. 15758593.6.

* cited by examiner

REFRIGERATION CYCLE APPARATUS

CROSS REFERENCE TO RELATED APPLICATIONS

This application is the U.S. national phase of International Patent Application No. PCT/JP2015/056717 filed on Mar. 6, 2015 and is based on International Patent Application No. PCT/JP2014/056022 filed on Mar. 7, 2014, the disclosures of which are incorporated herein by reference.

TECHNICAL FIELD

The present invention relates to a refrigeration cycle apparatus.

BACKGROUND ART

Patent Literature 1 describes a heat source apparatus provided with an upstream refrigeration cycle and a downstream refrigeration cycle. In the heat source apparatus, a water heat exchanger of the upstream refrigeration cycle is connected with the upstream side of a flow channel of a heat load medium, and a water heat exchanger of the downstream refrigeration cycle is connected with the downstream side of the flow channel of the heat load medium.

CITATION LIST

Patent Literature

Patent Literature 1: Japanese Unexamined Patent Application Publication No. 2008-267722

SUMMARY OF INVENTION

Technical Problem

In the heat source apparatus of Patent Literature 1, as each of two radiators (water heat exchangers) is provided to each of different refrigeration cycles, highly efficient operation can be performed depending on the condition. However, Patent Literature 1 fails to describe that condensing operation and supercritical operation may be mixed in the case of using refrigerant whose critical temperature is close to the air temperature, and also fails to describe the capacities of the radiators, for example. Thus, compressor efficiency may deteriorate and the amount of refrigerant is made difficult to be reduced.

The present invention has been made to solve the problems described above. An object of the present invention is to provide a refrigeration cycle apparatus having improved operation efficiency and a reduced amount of refrigerant.

Solution to Problem

A refrigeration cycle apparatus, according to an embodiment of the present invention, includes a first refrigerant circuit and a second refrigerant circuit each configured to circulate a refrigerant of the same composition. The first refrigerant circuit is provided with a first radiator configured to condense the refrigerant to transfer heat to external fluid, and the second refrigerant circuit is provided with a second radiator configured to transfer heat to the external fluid while allowing the refrigerant to be maintained in a supercritical state. The first radiator is arranged upstream of the second radiator in a direction of the flow of the external fluid, and the capacity of the refrigerant flow channel of the second radiator is smaller than the capacity of the refrigerant flow channel of the first radiator.

Advantageous Effects of Invention

According to an embodiment of the present invention, by appropriately setting the capacities of the refrigerant flow channels of the radiators depending on the pressures at the time of heat transfer, the operation efficiency of the refrigeration cycle apparatus is increased and the amount of refrigerant can be reduced.

DESCRIPTION OF EMBODIMENTS

Embodiment 1

Figure 1:
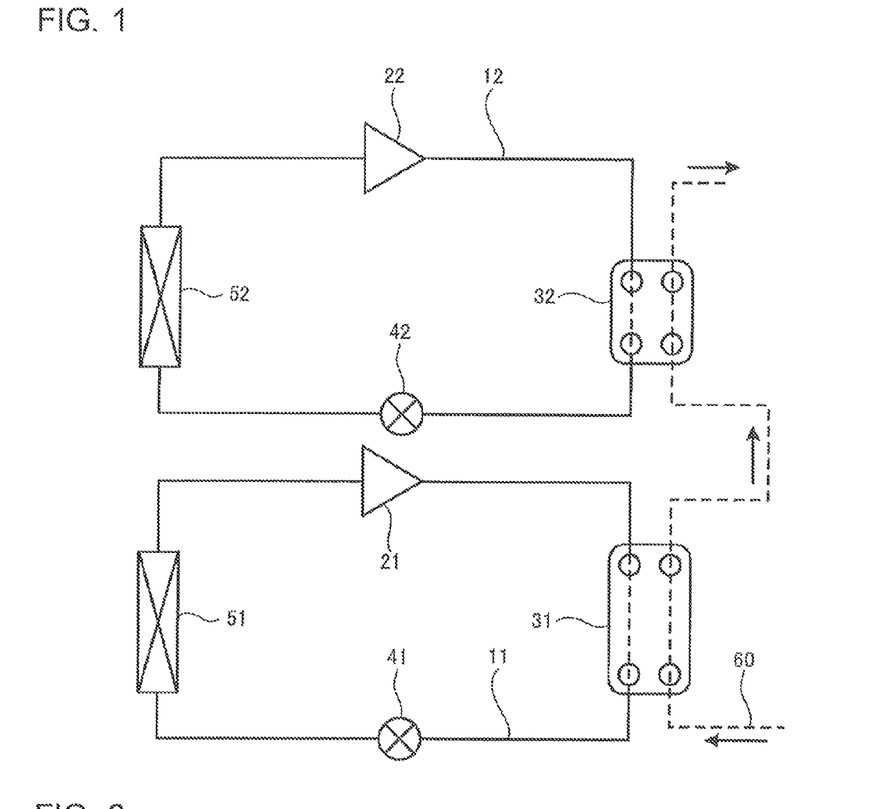
FIG. 1 is a refrigerant circuit diagram illustrating a schematic configuration of a refrigeration cycle apparatus according to Embodiment 1 of the present invention.

A refrigeration cycle apparatus according to Embodiment 1 of the present invention will be described. A refrigeration cycle apparatus according to Embodiment 1 is used as a heat source apparatus for heating water or brine to generate hot water in a refrigerating and air-conditioning apparatus or a water heater, for example. FIG. 1 is a refrigerant circuit diagram illustrating a schematic configuration of the refrigeration cycle apparatus according to Embodiment 1.

As illustrated in FIG. 1, a refrigeration cycle apparatus of Embodiment 1 includes a refrigerant circuit 11, and a refrigerant circuit 12 provided separately from the refrigerant circuit 11. The refrigerant circuits 11 and 12 are configured to circulate refrigerant independently from each other. While a refrigerant of the same composition is used in the refrigerant circuit 11 and refrigerant circuit 12 in this example, different refrigerants may be used. As a refrigerant, an HFC based refrigerant, an HFO based refrigerant, a $CO_2$ refrigerant, or another related refrigerant may be used.

The refrigerant circuit 11 is provided with a compressor 21, a radiator 31, an expansion device 41, and an evaporator 51 in this order. The compressor 21, the radiator 31, the expansion device 41, and the evaporator 51 are connected via refrigerant pipes.

The refrigerant circuit 12 is provided with a compressor 22, a radiator 32, an expansion device 42, and an evaporator 52 in this order. The compressor 22, the radiator 32, the expansion device 42, and the evaporator 52 are connected via refrigerant pipes.

The compressors 21 and 22 are fluid machinery configured to suck and compress low-temperature and low-pressure refrigerant into high-temperature and high-pressure refrigerant, and discharge it. In this example, the compressor 22 of the refrigerant circuit 12 compresses the refrigerant to have the critical pressure or higher to allow it to be in a supercritical state, at the time of normal operation (hereinafter, refrigerant in a supercritical state may be referred to as "supercritical refrigerant"), and the compressor 21 of the refrigerant circuit 11 compresses the refrigerant to have the critical pressure or lower to allow it to be in a state of high-pressure gas, at the time of normal operation. The pressure of the refrigerant compressed by the compressor 21 is lower than the pressure of the refrigerant compressed by the compressor 22.

The radiators 31 and 32 are water heat exchangers configured to allow heat exchange between the high-temperature and high-pressure refrigerant compressed by the compressor 21 and water (an example of external fluid). As each of the radiators 31 and 32, a plate-type heat exchanger in which a plurality of heat transfer plates are layered is used. In this example, at the time of normal operation, the radiator 32 of the refrigerant circuit 12 transfers heat to the water while allowing the refrigerant to be maintained in a supercritical state, and the radiator 31 of the refrigerant circuit 11 transfers heat to the water by condensing the gas refrigerant. As described below, the refrigerant pressure of the radiator 32 at the time of heat transfer is higher than the refrigerant pressure of the radiator 31 at the time of heat transfer. Further, the refrigerant temperature of the radiator 32 at the time of heat transfer is higher than the refrigerant temperature of the radiator 31 at the time of heat transfer.

In Embodiment 1, the capacity (volume) of the refrigerant flow channel in the radiator 32 is smaller than the capacity of the refrigerant flow channel in the radiator 31. In the case where the radiators 31 and 32 are plate-type heat exchangers, the number of heat transfer plates of the radiator 32 may be smaller than the number of heat transfer plates of the radiator 31, and the height of each heat transfer plate of the radiator 32 may be shorter than the height of each heat transfer plate of the radiator 31, for example. In FIG. 1, a magnitude correlation between the sizes in the vertical direction of the radiator 31 and the radiator 32 represents a magnitude correlation between the capacities of the refrigerant flow channels (provided that it does not represent a ratio between the capacities of the refrigerant flow channels). Further, the area of heat transfer between the refrigerant and the water in the radiator 32 is smaller than the area of heat transfer between the refrigerant and the water in the radiator 31. Furthermore, the refrigerant flow channel in the radiator 32 is narrower than the refrigerant flow channel in the radiator 31. For example, in the case where the radiators 31 and 32 are heat exchangers using heat transfer pipes, the pipe diameter of the heat transfer pipe in the radiator 32 is smaller than the pipe diameter of the heat transfer pipe in the radiator 31.

Further, the radiators 31 and 32 are connected in series via a water pipe 60. In other words, that the radiators 31 and 32 are arranged in series in the direction of the flow of water (in FIG. 1, the water flow direction is indicated by solid line arrows). The radiator 31 is arranged upstream of the radiator 32 in the direction of the flow of water. As the refrigerant temperature of the radiator 32 is higher than the refrigerant temperature of the radiator 31, the arrangement as described above can equalize the temperature gradient between the refrigerant and the water in each of the radiators 31 and 32 and thus can improve the heat exchange efficiency.

The expansion device 41 decompresses and expands high-pressure liquid refrigerant into two-phase gas-liquid refrigerant, and the expansion device 42 decompresses and expands high-pressure supercritical refrigerant into two-phase gas-liquid refrigerant. As the expansion devices 41 and 42, expansion valves, capillary tubes, or other devices are used.

The evaporators 51 and 52 are heat exchangers evaporating two-phase gas-liquid refrigerant decompressed by the expansion devices 41 or 42 through heat exchange with outdoor air.

Meanwhile, compared with conventional refrigerants such as R410A (critical temperature: 72.5 degrees C.) and R134a (critical temperature: 101 degrees C.), the critical temperature (59.2 degrees C.) of R1123 is lower. Thus, when a refrigerant containing R1123 (a single component refrigerant of R1123, or a mixed refrigerant containing R1123, for example) is used, a difference between the critical temperature of the refrigerant and the temperature of the external fluid (water in this example) is small. Consequently, using a refrigerant of the same composition containing R1123 in both the refrigerant circuits 11 and 12 facilitates condensing operation in the refrigerant circuit 11 and supercritical operation in the refrigerant circuit 12. Note that in the case of using a mixed refrigerant, R32, R1234yf, or another related refrigerant can be used as refrigerant to be mixed with R1123, for example. The mixing ratio of R1123 in the mixed refrigerant is 50 wt % or more, for example.

Further, when a refrigerant of the same composition is used in the refrigerant circuits 11 and 12, as the operating characteristics are similar, the specifications of the components of the refrigerant circuits 11 and 12 can be made common. Thus, the cost of the refrigerant circuits 11 and 12 can be reduced. Further, even in the manufacturing facility where the refrigerant circuit 11 and 12 are manufactured, the specifications of refrigerant storages and refrigerant sealing devices can be made common or shared. Consequently, the facility cost can be reduced compared with the case of using different refrigerants in the refrigerant circuits 11 and 12.

Figure 2:
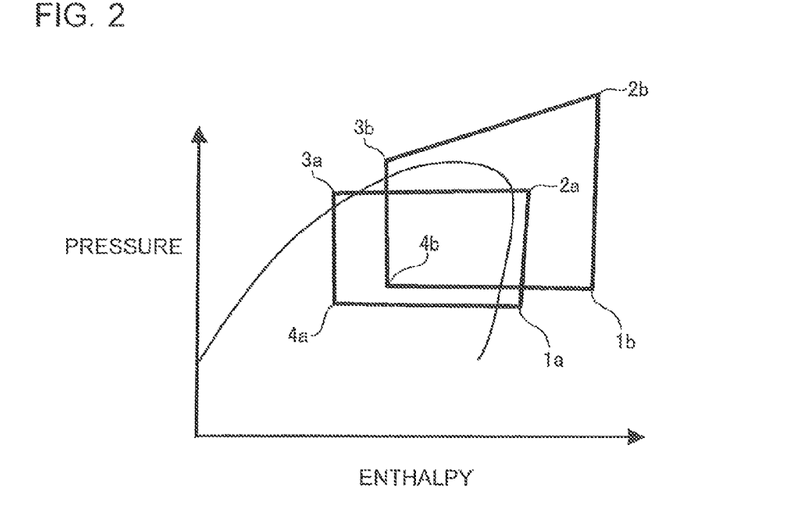
FIG. 2 is a p-h diagram illustrating the state of refrigerant in refrigerant circuits 11 and 12 of the refrigeration cycle apparatus according to Embodiment 1 of the present invention.

FIG. 2 is a p-h diagram illustrating the state of refrigerant in the refrigerant circuits 11 and 12 of the refrigeration cycle apparatus. First, the state of refrigerant in the refrigerant circuit 11 will be described using FIG. 2. Low-temperature and low-pressure gas refrigerant (point 1a in FIG. 2) is sucked and compressed by the compressor 21 (compression process) to be high-temperature and high-pressure gas refrigerant (point 2a). The high-temperature and high-pressure gas refrigerant transfers heat to the water in the radiator 31, and the refrigerant itself is cooled and condensed (condensation process) thereby to be high-pressure liquid refrigerant (point 3a). In the condensation process, gas refrigerant having a density of about 100 kg/m$^3$ is changed in phase, through a two-phase state, to be liquid refrigerant having a density of about 1,000 kg/m$^3$. The high-pressure liquid refrigerant is decompressed and expanded by the expansion device 41 (expansion process) to be low-pressure two-phase refrigerant (point 4a). The low-pressure two-phase refrigerant is heated through heat exchange with the air and evaporated in the evaporator 51 (evaporation process) to be low-temperature and low-pressure gas refrigerant (point 1a).

Next, the state of refrigerant in the refrigerant circuit 12 will be described. Low-temperature and low-pressure gas refrigerant (point 1b) is sucked and compressed by the compressor 22 (compression process) to be high-temperature and high-pressure supercritical refrigerant (point 2b). The high-temperature and high-pressure supercritical refrigerant transfers heat to the water in the radiator 32 (heat transfer process), and the refrigerant itself is cooled to be relatively-low-temperature supercritical refrigerant (point 3b). In the heat transfer process, the temperature of the supercritical refrigerant drops from about 60 degrees C. to about 40 degrees C., and the density of the supercritical refrigerant increases from about 700 kg/m$^3$ to about 1,000 kg/m$^3$. The pressure of the supercritical refrigerant decreases accordingly in the heat transfer process. The low-temperature supercritical refrigerant is decompressed and expanded in the expansion device 42 (expansion process) to be low-pressure two-phase refrigerant (point 4b). The low-pressure two-phase refrigerant is heated through heat exchange with the air and evaporated in the evaporator 52 (evaporation process) to be low-temperature and low-pressure gas refrigerant (point 1b).

Here, the states of refrigerant in the refrigerant circuit 11 and the refrigerant circuit 12 are compared. Both the pressure and the temperature of the refrigerant after the compression process (point 2b) in the refrigerant circuit 12 are higher than the pressure and the temperature of the refrigerant after the compression process (point 2a) in the refrigerant circuit 11. Both the pressure (pressure at the time of heat transfer) and the temperature of the refrigerant (point 2b to point 3b) in the radiator 32 of the refrigerant circuit 12 are higher than the pressure and the temperature of the refrigerant (point 2a to point 3a) in the radiator 31 of the refrigerant circuit 11.

Further, the density of the refrigerant changes from about 100 kg/m$^3$ to about 1,000 kg/m$^3$ in the radiator 31 of the refrigerant circuit 11, while the density of the refrigerant changes from about 700 kg/m$^3$ to about 1,000 kg/m$^3$ in the radiator 32 of the refrigerant circuit 12. While the density of the liquid refrigerant after the condensation process and the density of the supercritical refrigerant after the heat transfer process are almost similar, the density of the gas refrigerant before the condensation process and the density of the supercritical refrigerant before the heat transfer process largely differ from each other. Thus, the density of the refrigerant in the refrigerant flow channel of the radiator 32 of the refrigerant circuit 12 is larger than the density of the refrigerant in the refrigerant flow channel of the radiator 31 of the refrigerant circuit 11. Note that the density of refrigerant in a refrigerant flow channel in a radiator is an average density of the entire refrigerant in the refrigerant flow channel of the radiator.

The radiator 32 in which refrigerant of a relatively high density flows has lower heat transfer performance than that of the radiator 31 in which refrigerant of a relatively low density flows. In the radiator 32 of lower heat transfer performance, decreasing the capacity of the refrigerant flow channel to increase the flow speed of the refrigerant can improve the heat transfer performance. Further, decreasing the capacity of the refrigerant flow channel of the radiator 32 can reduce the amount of refrigerant of the refrigeration cycle apparatus.

On the other hand, the radiator 32 in which refrigerant in a supercritical state flows has a smaller pressure loss than that of the radiator 31 in which condensed liquid refrigerant flows. Thus, the diameter of the refrigerant flow channel in the radiator 32 can be reduced. Reducing the diameter of the refrigerant flow channel in the radiator 32 can increase the flow speed of the refrigerant in the radiator 32 to improve the heat transfer performance of the radiator 32. Further, reducing the diameter of the refrigerant flow channel in the radiator 32 can decrease the capacity of the refrigerant flow channel in the radiator 32 to reduce the amount of refrigerant of the refrigeration cycle apparatus.

As described above, in Embodiment 1, the radiator configured to transfer heat to the water in the water pipe 60 is divided into the radiator 31 configured to condense the refrigerant to transfer heat to the water and the radiator 32 configured to transfer heat to the water while allowing the refrigerant to be maintained in a supercritical state. Thus, reducing the capacity of the refrigerant flow channel of the radiator 32 can reduce the amount of refrigerant. Further, compared with the case of operation by one refrigerant circuit in a supercritical state, the pressure on the high-pressure side of the refrigerant circuit 11 arranged upstream in the direction of the flow of water can be decreased to perform highly efficient operation.

As described above, the refrigeration cycle apparatus, according to Embodiment 1, includes the refrigerant circuits 11 and 12 in each of which a refrigerant of the same composition is circulated. The refrigerant circuit 11 is provided with the radiator 31 configured to condense the refrigerant to transfer heat to the external fluid (water in this example), and the refrigerant circuit 12 is provided with the radiator 32 configured to transfer heat to the external fluid while allowing the refrigerant to be maintained in a supercritical state. The radiator 31 is arranged upstream of the radiator 32 in the direction of the flow of the external fluid, and the capacity of the refrigerant flow channel of the radiator 32 is smaller than the capacity of the refrigerant flow channel of the radiator 31.

Further, the refrigeration cycle apparatus, according to Embodiment 1, includes at least one refrigerant circuit (two refrigerant circuits 11 and 12 in this example) configured to circulate refrigerant, and the refrigerant circuit is provided with at least one compressor (compressors 21 and 22 in this example), a plurality of radiators (radiators 31 and 32 in this example) configured to transfer heat to the external fluid (water in this example), at least one expansion device (expansion devices 41 and 42 in this example), and at least one evaporator (evaporators 51 and 52 in this example). The radiators are arranged in series in the direction of the flow of the external fluid, and the pressures of the radiators differ from each other when the radiators transfer heat, and the capacities of the refrigerant flow channels of the radiators differ from each other.

Further, the refrigeration cycle apparatus, according to Embodiment 1, is configured so that the density of the refrigerant in the refrigerant flow channel of the radiator 32 is higher than the density of the refrigerant in the refrigerant flow channel of the radiator 31, and that the capacity of the refrigerant flow channel of the radiator 32 is smaller than the capacity of the refrigerant flow channel of the radiator 31. Thus, in the refrigeration cycle apparatus according to Embodiment 1, the capacity of a radiator is smaller as the density of the refrigerant in the refrigerant flow channel is higher.

Further, the refrigeration cycle apparatus, according to Embodiment 1, is configured so that the radiator 31 condenses the refrigerant to transfer heat to the external fluid, and that the radiator 32 transfers heat to the external fluid while allowing the refrigerant to be maintained in a supercritical state.

Embodiment 2

Figure 3:
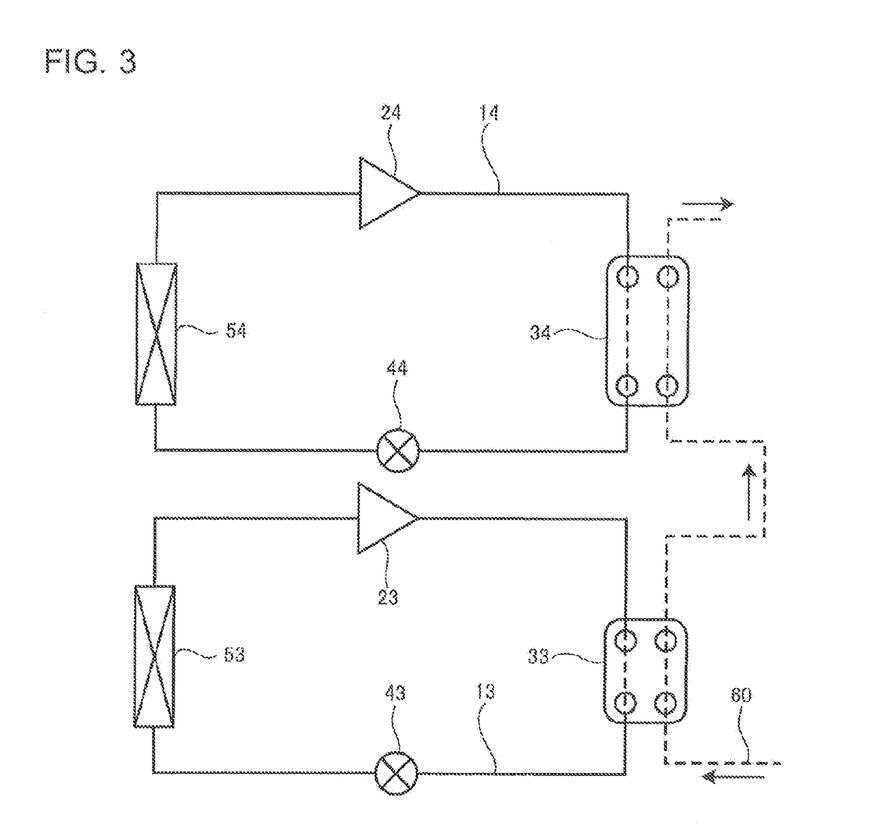
FIG. 3 is a refrigerant circuit diagram illustrating a schematic configuration of a refrigeration cycle apparatus according to Embodiment 2 of the present invention.

A refrigeration cycle apparatus according to Embodiment 2 of the present invention will be described. FIG. 3 is a refrigerant circuit diagram illustrating a schematic configuration of the refrigeration cycle apparatus according to Embodiment 2. As illustrated in FIG. 3, the refrigeration cycle apparatus of Embodiment 2 includes a refrigerant circuit 13, and a refrigerant circuit 14 provided separately from the refrigerant circuit 13. The refrigerant circuit 13 is provided with a compressor 23, a radiator 33, an expansion device 43, and an evaporator 53, in this order. The refrigerant circuit 14 is provided with a compressor 24, a radiator 34, an expansion device 44, and an evaporator 54, in this order.

Each of the compressors 23 and 24 is configured to compress refrigerant to have the critical pressure or lower to allow it to be in a high-pressure gas state. The pressure of the refrigerant compressed by the compressor 23 is lower than the pressure of the refrigerant compressed by the compressor 24.

Each of the radiators 33 and 34 is configured to condense gas refrigerant to transfer heat to the water. The refrigerant pressure (condensing pressure) of the radiator 34 at the time of heat transfer is higher than the refrigerant pressure (condensing pressure) of the radiator 33 at the time of heat transfer. Further, the refrigerant temperature (condensing temperature) of the radiator 34 at the time of heat transfer is higher than the refrigerant temperature (condensing temperature) of the radiator 33 at the time of heat transfer.

In Embodiment 2, the capacity of the refrigerant flow channel in the radiator 33 is smaller than the capacity of the refrigerant flow channel in the radiator 34.

Further, the radiators 33 and 34 are arranged in series in the direction of the flow of water. The radiator 33 is arranged upstream of the radiator 34 in the direction of the flow of water. As the refrigerant temperature of the radiator 34 is higher than the refrigerant temperature of the radiator 33, the arrangement described above can increase the heat exchange efficiency.

As the expansion devices 43 and 44 and the evaporators 53 and 54 are the same as those in Embodiment 1, their description is omitted.

Figure 4:
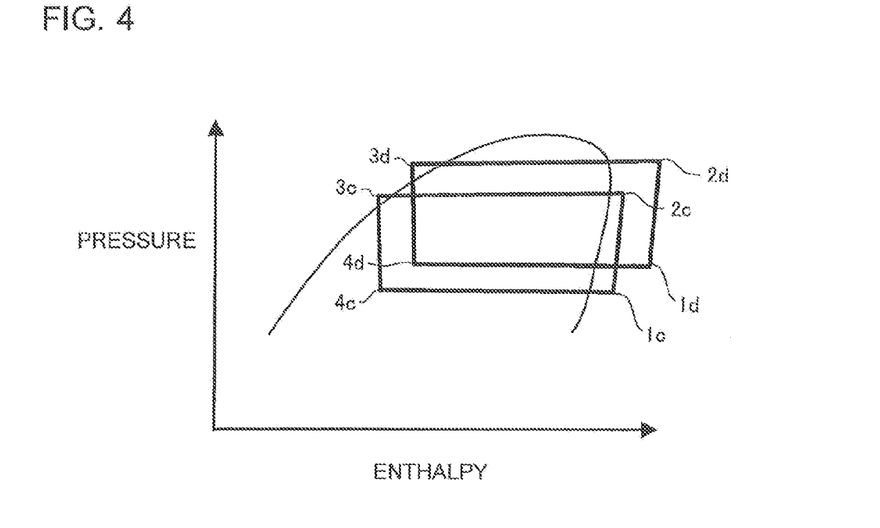
FIG. 4 is a p-h diagram illustrating the state of refrigerant in refrigerant circuits 13 and 14 of the refrigeration cycle apparatus according to Embodiment 2 of the present invention.

FIG. 4 is a p-h diagram illustrating the state of refrigerant in the refrigerant circuits 13 and 14 of the refrigeration cycle apparatus. First, the state of refrigerant in the refrigerant circuit 13 will be described using FIG. 4. Low-temperature and low-pressure gas refrigerant (point 1c in FIG. 4) is sucked and compressed by the compressor 23 (compression process) to be high-temperature and high-pressure gas refrigerant (point 2c). The high-temperature and high-pressure gas refrigerant transfers heat to the water in the radiator 33, and the refrigerant itself is cooled and condensed (condensation process) thereby to be high-pressure liquid refrigerant (point 3c). The high-pressure liquid refrigerant is decompressed and expanded by the expansion device 43 (expansion process) to be low-pressure two-phase refrigerant (point 4c). The low-pressure two-phase refrigerant is heated through heat exchange with the air and evaporated by the evaporator 53 (evaporation process) to be low-temperature and low-pressure gas refrigerant (point 1c).

Next, the state of refrigerant in the refrigerant circuit 14 will be described. Low-temperature and low-pressure gas refrigerant (point 1d) is sucked and compressed by the compressor 24 (compression process) to be high-temperature and high-pressure gas refrigerant (point 2d). The high-temperature and high-pressure gas refrigerant transfers heat to the water in the radiator 34, and the refrigerant itself is cooled and condensed (condensation process) thereby to be high-pressure liquid refrigerant (point 3d). The high-pressure liquid refrigerant is decompressed and expanded by the expansion device 44 (expansion process) to be low-pressure two-phase refrigerant (point 4d). The low-pressure two-phase refrigerant is heated through heat exchange with the air and evaporated in the evaporator 54 (evaporation process) to be low-temperature low-pressure gas refrigerant (point 1d).

Both the pressure and the temperature of the refrigerant (point 2d) after the compression process in the refrigerant circuit 14 are higher than the pressure and the temperature of the refrigerant (point 2c) after the compression process in the refrigerant circuit 13. Both the pressure and the temperature of the refrigerant (point 2d to point 3d) in the radiator 34 of the refrigerant circuit 14 are higher than the pressure and the temperature of the refrigerant (point 2c to point 3c) in the radiator 33 of the refrigerant circuit 13.

Further, in the radiator 33, as heat is exchanged with water of a further upstream-side (low-temperature side), refrigerant is likely to be liquefied. Consequently, the liquid ratio of the refrigerant in the refrigerant flow channel of the radiator 33 is higher than that of the refrigerant in the refrigerant flow channel of the radiator 34. Thus, the density of the refrigerant in the refrigerant flow channel of the radiator 33 of the refrigerant circuit 13 is higher than the density of the refrigerant in the refrigerant flow channel of the radiator 34 of the refrigerant circuit 14.

The radiator 33 in which refrigerant of a relatively high density flows has lower heat transfer performance than that of the radiator 34 in which refrigerant of a relatively low density flows. In the radiator 33 of lower heat transfer performance, decreasing the capacity of the refrigerant flow channel to increase the flow speed of the refrigerant can improve the heat transfer performance. Further, decreasing capacity of the refrigerant flow channel of the radiator 33 can reduce the amount of refrigerant of the refrigeration cycle apparatus.

As described above, the refrigeration cycle apparatus according to Embodiment 2 includes at least one refrigerant circuit (two refrigerant circuits 13 and 14 in this example) configured to circulate refrigerant, and the refrigerant circuit is provided with at least one compressor (compressors 23 and 24 in this example), a plurality of radiators (radiators 33 and 34 in this example) configured to transfer heat to the external fluid (water in this example), at least one expansion device (expansion devices 43 and 44 in this example), and at least one evaporator (evaporators 53 and 54 in this example). The radiators are arranged in series in the direction of the flow of the external fluid, and the pressures of the radiators differ from each other at the time of heat transfer, and the capacities of the refrigerant flow channels of the radiators differ from each other.

Further, the refrigeration cycle apparatus, according to Embodiment 2, is configured so that the density of the refrigerant in the refrigerant flow channel of the radiator 33 is higher than the density of the refrigerant in the refrigerant flow channel of the radiator 34, and that the capacity of the refrigerant flow channel of the radiator 33 is smaller than the capacity of the refrigerant flow channel of the radiator 34. Thus, in the refrigeration cycle apparatus according to Embodiment 2, the capacity of a radiator is smaller as the density of the refrigerant in the refrigerant flow channel is higher, as in the case of Embodiment 1.

Further, the refrigeration cycle apparatus according to Embodiment 2 is configured so that both the radiators 33 and 34 are configured to condense the refrigerant to transfer heat to the external fluid, and that the pressure of the radiator 33 at the time of heat transfer is lower than the pressure of the radiator 34 at the time of heat transfer.

In Embodiment 2, while both the radiators 33 and 34 are configured to condense gas refrigerant to transfer heat to the water, both the radiators 33 and 34 may transfer heat to the water while allowing the refrigerant to be maintained in a supercritical state. In this case, as heat is exchanged with water on a further upstream side (low-temperature side) in the radiator 33, the refrigerant temperature becomes lower than that of the refrigerant in the radiator 34. Consequently, the density of the refrigerant in the refrigerant flow channel of the radiator 33 is higher than the density of the refrigerant in the refrigerant flow channel of the radiator 34.

The radiator 33 in which refrigerant of a relatively high density flows has lower heat transfer performance than that of the radiator 34 in which refrigerant of a relatively low density flows. In the radiator 33 of lower heat transfer performance, decreasing the capacity of the refrigerant flow channel to increase the flow speed of the refrigerant can improve the heat transfer performance. Further, decreasing the capacity of the refrigerant flow channel of the radiator 33 can reduce the amount of refrigerant of the refrigeration cycle apparatus. Thus, even in the case where both the radiators 33 and 34 are configured to transfer heat to the water while allowing the refrigerant to be maintained in a supercritical state, decreasing the capacity of the refrigerant flow channel of the radiator 33 from that of the radiator 34 can achieve the same effect as described above.

Embodiment 3

A refrigeration cycle apparatus according to Embodiment 3 of the present invention will be described. The refrigeration cycle apparatus according to Embodiment 3 has a configuration similar to that of Embodiment 1 or 2 or Embodiment 4 or 5 described below, and uses high-pressure refrigerant having low global warming potential (GWP) as refrigerant. In the case of using a mixed refrigerant, as refrigerant to be mixed with the high-pressure refrigerant of low GWP, R32, R1234yf, or another related refrigerant may be used, for example. A mixture ratio of the high-pressure refrigerant of low GWP in the mixed refrigerant is 50 wt % or more, for example.

The thermophysical property of low-pressure R1234yf of low-GWP is extremely close to that of R134a that is an HFC refrigerant. Thus, in an automobile air-conditioning apparatus (car air conditioning apparatus) currently using only an R134a refrigerant, no performance problem is found even when the refrigerant is replaced with R1234yf. However, in air conditioning apparatuses or water heaters for home use or business use using an HFC-mixed refrigerant R410A or R407C having lower boiling point than that of R134a, as the operation pressure of R1234yf is low, it is necessary to increase the refrigerant circulation amount to maintain the same performance. When the refrigerant circulation amount is increased, in the same circuit (refrigeration cycle), the flow speed of the refrigerant flowing the circuit is increased, thus increasing a pressure loss of the refrigerant in the refrigeration cycle. Consequently, the operation efficiency of the refrigeration cycle may deteriorate. Thus, by using a refrigerant whose GWP is equal (0) to that of R1234yf and whose operation pressure is higher than that of R1234yf, the operation efficiency of the refrigeration does not deteriorate even when such a refrigerant is used in substitution for R410A or R407C.

In Embodiment 3, as the radiators are dividedly provided to two refrigerant circuit similar to the case of Embodiment 1 or 2, the pressure on the high-pressure side is easily reduced compared with the case of operation with one refrigerant circuit. Further, as a rise in the discharge temperature is controlled even when the discharge temperature is increased excessively, highly efficient operation of the compressor can be performed.

Embodiment 4

Figure 5:
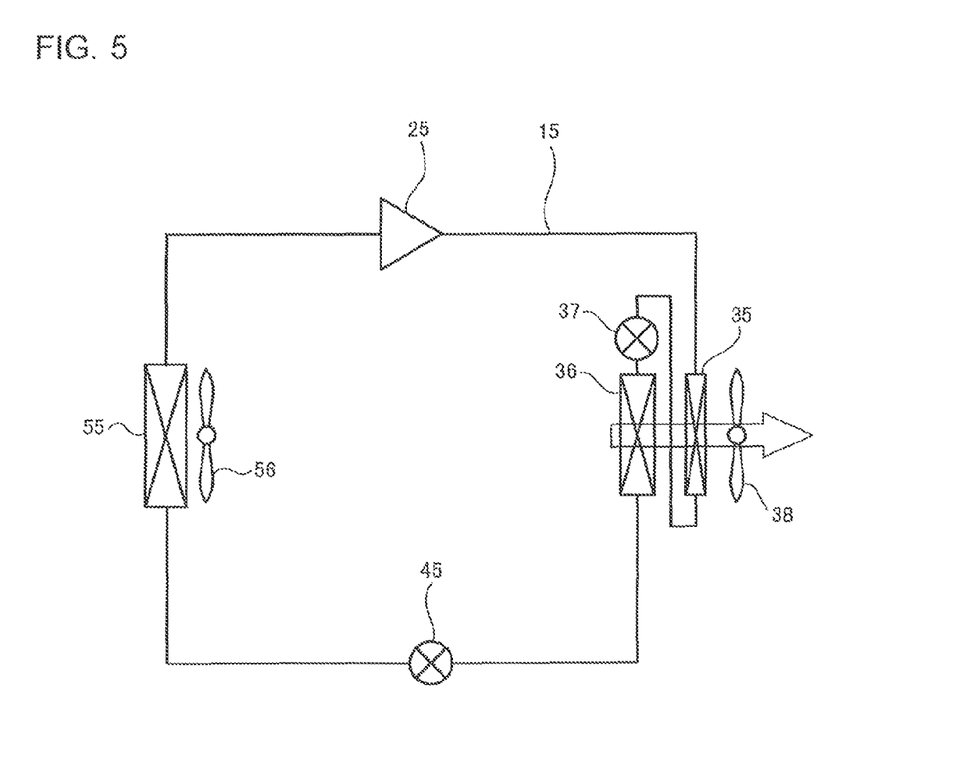
FIG. 5 is a refrigerant circuit diagram illustrating a schematic configuration of a refrigeration cycle apparatus according to Embodiment 4 of the present invention.

A refrigeration cycle apparatus according to Embodiment 4 of the present invention will be described. The refrigeration cycle apparatus according to Embodiment 4 is used as an air-conditioning apparatus for generating air-conditioned air (hot air) by heating the indoor air, for example. FIG. 5 is a refrigerant circuit diagram illustrating a schematic configuration of the refrigeration cycle apparatus according to Embodiment 4.

As illustrated in FIG. 5, the refrigeration cycle apparatus of Embodiment 4 includes a refrigerant circuit 15 configured to circulate refrigerant. As refrigerant, a low-GWP and high-pressure refrigerant or a mixed refrigerant of a low-GWP and high-pressure refrigerant may be used, as in the case of Embodiment 3, or another refrigerant such as an HFC-based refrigerant, an HFO-based refrigerant, and a $CO_2$ refrigerant may be used.

The refrigerant circuit 15 is provided with a compressor 25, a radiator 35, an expansion device 37, a radiator 36, an expansion device 45, and an evaporator 55, in this order. The compressor 25, the radiator 35, the expansion device 37, the radiator 36, the expansion device 45 and the evaporator 55 are connected via refrigerant pipes. In the refrigerant circuit 15, the two radiators 35 and 36 are connected in series in the direction of the flow of refrigerant.

The compressor 25 compresses refrigerant to have the critical pressure or higher to allow it to be in a supercritical state.

The radiator 35 is an air heat exchanger configured to allow heat exchange between high-temperature and high-pressure supercritical refrigerant compressed by the compressor 25 and indoor air (an example of external fluid) sent by an indoor fan 38. The radiator 35 transfers heat to the indoor air while allowing the refrigerant to be maintained in a supercritical state. As the radiator 35, a cross-fin heat exchanger provided with a plurality of heat transfer fins layered each other and a plurality of heat transfer pipes penetrating the heat transfer fins is used, for example. In the case of a cross-fin heat exchanger, the inside of each heat transfer pipe serves as a refrigerant flow channel.

The expansion device 37 decompresses and expands supercritical refrigerant flowing out of the radiator 35 into two-phase gas-liquid refrigerant. As the expansion device 37, an expansion valve, a capillary tube, or another related component is used.

The radiator 36 is an air heat exchanger configured to allow heat exchange between the two-phase gas-liquid refrigerant decompressed by the expansion device 37 and the indoor air sent by the indoor fan 38. The radiator 36 is configured to condense the two-phase gas-liquid refrigerant to transfer heat to the indoor air. As the radiator 36, a cross-fin heat exchanger is used, for example. The refrigerant pressure of the radiator 36 at the time of heat transfer is lower than the refrigerant pressure of the radiator 35 at the time of heat transfer. Further, the refrigerant temperature of the radiator 36 at the time of heat transfer is lower than the refrigerant temperature of the radiator 35 at the time of heat transfer.

The expansion device 45 decompresses and expands the high-pressure liquid refrigerant flowing out of the radiator 36 into low-pressure two-phase gas-liquid refrigerant. As the expansion device 45, an expansion valve, a capillary tube, or another related component is used.

The evaporator 55 is a heat exchanger configured to allow heat exchange between the two-phase gas-liquid refrigerant decompressed by the expansion device 45 and the outdoor air sent by an outdoor fan 56 to evaporate the two-phase gas-liquid refrigerant.

In Embodiment 4, the capacity of the refrigerant flow channel in the radiator 35 is smaller than the capacity of the refrigerant flow channel in the radiator 36. In the case where the radiators 35 and 36 are cross-fin heat exchangers, the number of rows of the heat transfer pipes of the radiator 35 in the air flow direction is smaller than that of the radiator 36, for example. In FIG. 5, a magnitude correlation between the sizes in the horizontal direction of the radiator 35 and the radiator 36 represents a magnitude correlation between the capacities of the refrigerant flow channels (provided that it does not represent a ratio between the capacities of the refrigerant flow channels). Further, the area of heat transfer between the refrigerant and the water in the radiator 35 is smaller than the area of heat transfer between the refrigerant and the water in the radiator 36. Furthermore, the refrigerant flow channel in the radiator 35 is narrower than the refrigerant flow channel in the radiator 31. For example, the pipe diameter of the heat transfer pipe in the radiator 35 is smaller than the pipe diameter of the heat transfer pipe in the radiator 36.

Further, the radiators 35 and 36 are arranged in series in the direction of the flow of indoor air sent by the indoor fan 38 (in FIG. 5, the flow direction of the indoor air is indicated by a white bold arrow). The radiator 36 is arranged upstream of the radiator 35 in the direction of the flow of indoor air. As the refrigerant temperature of the radiator 35 is higher than the refrigerant temperature of the radiator 36, the arrangement described above can improve the heat exchange efficiency.

Figure 6:
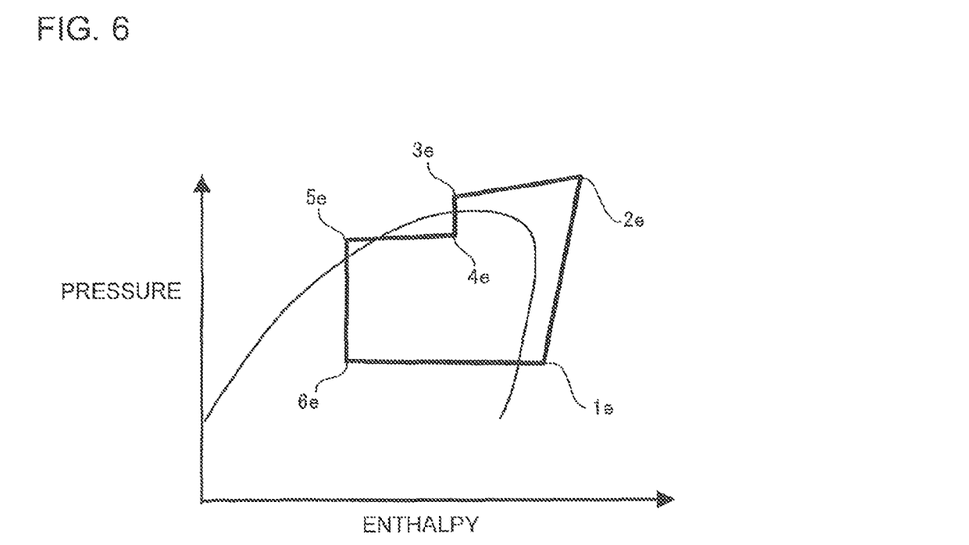
FIG. 6 is a p-h diagram illustrating the state of refrigerant in a refrigerant circuit 15 of the refrigeration cycle apparatus according to Embodiment 4 of the present invention.

FIG. 6 is a p-h diagram illustrating the state of refrigerant in the refrigerant circuit 15 of the refrigeration cycle apparatus. Low-temperature and low-pressure gas refrigerant (point 1e in FIG. 6) is sucked and compressed by the compressor 25 to be high-temperature and high-pressure supercritical refrigerant (point 2e). The supercritical refrigerant transfers heat to the indoor air in the radiator 35, and the refrigerant itself is cooled to be relatively low-temperature supercritical refrigerant (point 3e). The supercritical refrigerant is decompressed and expanded by the expansion device 37 to be high-pressure two-phase refrigerant (point 4e). The two-phase refrigerant transfers heat to the indoor air in the radiator 36, and the refrigerant itself is cooled and condensed thereby to be high-pressure liquid refrigerant (point 5e). The liquid refrigerant is decompressed and expanded by the expansion device 45 to be low-pressure two-phase refrigerant (point 6e). The two-phase refrigerant is heated through heat exchange with the outdoor air and evaporated in the evaporator 55 to be low-temperature and low-pressure gas refrigerant (point 1e).

Here, the states of refrigerant in the radiator 35 and the radiator 36 are compared. In the radiator 35, the refrigerant is maintained in a supercritical state (point 2e to point 3e). On the other hand, in the radiator 36, the two-phase refrigerant is condensed to be liquid refrigerant (point 4e to point 5e). While the density of the refrigerant in the radiator 36 is relatively lower because the refrigerant contains gas, the density of the refrigerant in the radiator 35 is relatively higher because the refrigerant is in a supercritical state. Thus, the density of the refrigerant in the refrigerant flow channel of the radiator 35 is higher than the density of the refrigerant in the refrigerant flow channel of the radiator 36.

The radiator 35 in which refrigerant of a relatively high density flows has lower heat transfer performance than that of the radiator 36 in which refrigerant of a relatively low density flows. In the radiator 35 of lower heat transfer performance, decreasing the capacity of the refrigerant flow channel to increase the flow speed of the refrigerant can improve the heat transfer performance. Further, decreasing the capacity of the refrigerant flow channel of the radiator 35 can reduce the amount of refrigerant of the refrigeration cycle apparatus.

On the other hand, the radiator 35 in which refrigerant in a supercritical state flows has a smaller pressure loss than that of the radiator 36 in which condensed liquid refrigerant flows. Thus, the diameter of the heat transfer pipe of the radiator 35 can be reduced. Reducing the diameter of the heat transfer pipe of the radiator 35 can increase the flow speed of the refrigerant in the radiator 35 to improve the heat transfer performance of the radiator 35. Further, reducing the diameter of the heat transfer pipe of the radiator 35 can decrease the capacity of the refrigerant flow channel in the radiator 35 to reduce the amount of refrigerant of the refrigeration cycle apparatus.

Further, in Embodiment 4, as a plurality of divided radiators are provided to one refrigerant circuit, one refrigerant circuit has a plurality of pressures at the time of heat transfer. Consequently, as the pressure of a high-pressure side and the pressure of a low-pressure side can be made closer in the refrigeration cycle, highly efficient operation can be performed compared with a refrigerant circuit having only one pressure at the time of heat transfer. This effect is increased as the number of divided radiators increases.

As described above, the refrigeration cycle apparatus according to Embodiment 4 includes the refrigerant circuit 15 configured to circulate refrigerant, and the refrigerant circuit 15 is provided with the radiator 36 configured to condense the refrigerant and transfer heat to external fluid (indoor air in this example), and the radiator 35 configured to transfer heat to the external fluid while allowing the refrigerant to be maintained in a supercritical state. The radiator 36 is arranged upstream of the radiator 35 in the direction of the flow of the external fluid, and the capacity of the refrigerant flow channel of the radiator 35 is smaller than the capacity of the refrigerant flow channel of the radiator 36.

Further, the refrigeration cycle apparatus, according to Embodiment 4, includes at least one refrigerant circuit (one refrigerant circuit 15 in this example) configured to circulate refrigerant, and the refrigerant circuit is provided with at least one compressor (compressor 25 in this example), a plurality of radiators (radiators 35 and 36 in this example) configured to transfer heat to the external fluid (indoor air in this example), at least one expansion device (expansion devices 37 and 45 in this example), and at least one evaporator (evaporator 55 in this example). The radiators are arranged in series in the direction of the flow of the external fluid, and the pressures of the radiators differ from each other at the time of heat transfer, and the capacities of the refrigerant flow channels of the radiators differ from each other.

Further, the refrigeration cycle apparatus, according to Embodiment 4, is configured so that the density of the refrigerant in the refrigerant flow channel of the radiator 35 is higher than the density of the refrigerant in the refrigerant flow channel of the radiator 36, and that the capacity of the refrigerant flow channel of the radiator 35 is smaller than the capacity of the refrigerant flow channel of the radiator 36. Thus, in the refrigeration cycle apparatus according to Embodiment 4, the capacity of a radiator is smaller as the density of the refrigerant in the refrigerant flow channel is higher, as in the case of Embodiments 1 and 2.

Note that while the radiators 35 and 36 of Embodiment 4 are arranged in series in the direction of the flow of indoor air sent by the indoor fan 38, the radiators 35 and 36 may be arranged in parallel in the direction of the flow of indoor air sent by a common indoor fan, or may be arranged on respective flows of indoor air, substantially independent from each other, sent by different indoor fans.

Embodiment 5

Figure 7:
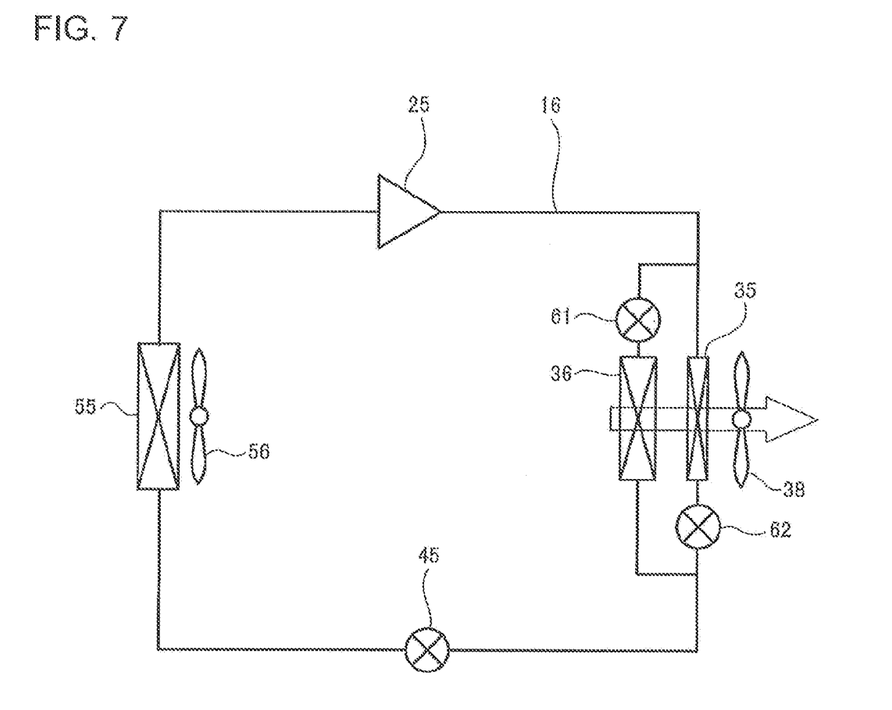
FIG. 7 is a refrigerant circuit diagram illustrating a schematic configuration of a refrigeration cycle apparatus according to Embodiment 5 of the present invention.

A refrigeration cycle apparatus according to Embodiment 5 of the present invention will be described. FIG. 7 is a refrigerant circuit diagram illustrating the refrigeration cycle apparatus according to Embodiment 5. As illustrated in FIG. 7, the refrigeration cycle apparatus of Embodiment 5 differs from that of Embodiment 4 in that two radiators 35 and 36 are connected in parallel to each other in a refrigerant circuit 16. In the refrigerant circuit 16, an expansion device 61 is provided on the inlet side of the radiator 36, and an expansion device 62 is provided on the outset side of the radiator 35. To the radiator 35, the refrigerant compressed by a compressor 25 directly flows in. On the other hand, to the radiator 36, the refrigerant compressed by the compressor 25 flows in after the refrigerant is decompressed by the expansion device 61. Thus, the refrigerant pressure of the radiator 36 at the time of heat transfer is lower than the refrigerant pressure of the radiator 35 at the time of heat transfer. Further, the refrigerant temperature of the radiator 36 at the time of heat transfer is lower than the refrigerant temperature of the radiator 35 at the time of heat transfer.

In Embodiment 5, the capacity of the refrigerant flow channel in the radiator 35 is smaller than the capacity of the refrigerant flow channel in the radiator 36, similar to the case of Embodiment 4. Further, the radiators 35 and 36 are arranged in series in the direction of the flow of indoor air. The radiator 36 is arranged upstream of the radiator 35 in the direction of the flow of indoor air. As the refrigerant temperature of the radiator 35 is higher than the refrigerant temperature of the radiator 36, the arrangement described above can improve the heat exchange efficiency.

Figure 8:
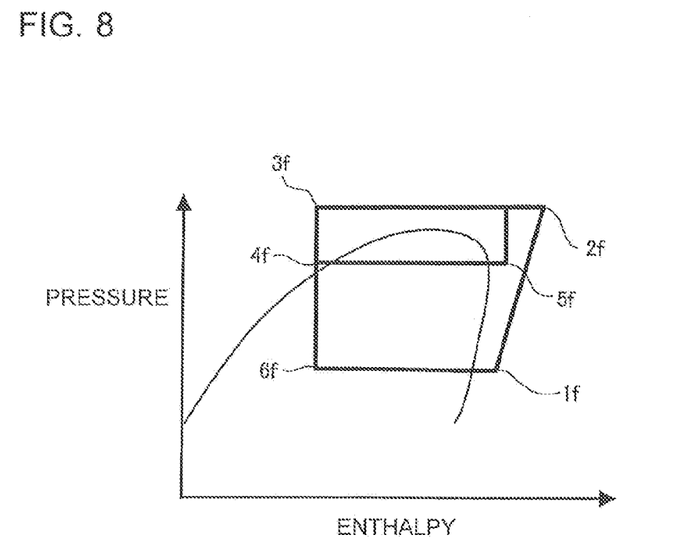
FIG. 8 is a p-h diagram illustrating the state of refrigerant in a refrigerant circuit 16 of the refrigeration cycle apparatus according to Embodiment 5 of the present invention.

FIG. 8 is a p-h diagram illustrating the state of refrigerant in the refrigerant circuit 16 of the refrigeration cycle apparatus. Low-temperature and low-pressure gas refrigerant (point $1f$ in FIG. 8) is sucked and compressed by the compressor 25 to be high-temperature and high-pressure supercritical refrigerant (point $2f$). Part of the supercritical refrigerant flows into the radiator 35, and the other flows into the expansion device 61. The supercritical refrigerant flowing in the radiator 35 transfers heat to the indoor air, and the refrigerant itself is cooled to be relatively low-temperature supercritical refrigerant (point $3f$). The supercritical refrigerant is decompressed and expanded by the expansion device 62 to be high-pressure liquid refrigerant (point $4f$).

On the other hand, the supercritical refrigerant flowing in the expansion device 61 is decompressed and expanded to be high-pressure gas refrigerant (point $5f$). The gas refrigerant transfers heat to the indoor air in the radiator 36, and the refrigerant itself is cooled to be condensed thereby to be high-pressure liquid refrigerant (point $4f$). The liquid refrigerant joins the liquid refrigerant decompressed by the expansion device 62, and further, decompressed and expanded by the expansion device 45 thereby to be low-pressure two-phase refrigerant (point $6f$). The two-phase refrigerant is heated through heat exchange with the outdoor air and evaporated in the evaporator 55 to be low-temperature and low-pressure gas refrigerant (point $1f$).

Here, the states of refrigerant in the radiator 35 and the radiator 36 are compared. In the radiator 35, the refrigerant is maintained in a supercritical state (point $2f$ to point $3f$). On the other hand, in the radiator 36, the gas refrigerant is condensed to be liquid refrigerant (point $5f$ to point $4f$). While the density of the refrigerant in the radiator 36 is relatively lower because the refrigerant contains gas, the density of the refrigerant in the radiator 35 is relatively higher because the refrigerant is in a supercritical state. Thus, the density of the refrigerant in the refrigerant flow channel of the radiator 35 is higher than the density of the refrigerant in the refrigerant flow channel of the radiator 36.

The radiator 35 in which refrigerant of a relatively high density flows has lower heat transfer performance than that of the radiator 36 in which refrigerant of a relatively low density flows. In the radiator 35 of lower heat transfer performance, decreasing the capacity of the refrigerant flow channel to increase the flow speed of the refrigerant can improve the heat transfer performance. Further, decreasing the capacity of the refrigerant flow channel of the radiator 35 can reduce the amount of refrigerant of the refrigeration cycle apparatus.

On the other hand, the radiator 35 in which refrigerant in a supercritical state flows has a smaller pressure loss than that of the radiator 36 in which condensed liquid refrigerant flows. Thus, the diameter of the heat transfer pipe of the radiator 35 can be reduced. Reducing the diameter of the heat transfer pipe of the radiator 35 can increase the flow speed of the refrigerant in the radiator 35 to improve the heat transfer performance of the radiator 35. Further, reducing the diameter of the heat transfer pipe of the radiator 35 can decrease the capacity of the refrigerant flow channel in the radiator 35 to reduce the amount of refrigerant of the refrigeration cycle apparatus.

Further, in Embodiment 5, as a plurality of divided radiators are provided to one refrigerant circuit, one refrigerant circuit has a plurality of pressures at the time of heat transfer. Consequently, as the pressure of a high-pressure side and the pressure of a low-pressure side can be made closer in the refrigeration cycle, highly efficient operation can be performed compared with a refrigerant circuit having only one pressure at the time of heat transfer. This effect is increased as the number of divided radiators increases.

As described above, the refrigeration cycle apparatus according to Embodiment 5 includes the refrigerant circuit 16 configured to circulate refrigerant, and the refrigerant circuit 16 is provided with the radiator 36 configured to condense the refrigerant and transfer heat to the external fluid (indoor air in this example), and the radiator 35 configured to transfer heat to the external fluid while allowing the refrigerant to be maintained in a supercritical state. The radiator 36 is arranged upstream of the radiator 35 in the direction of the flow of the external fluid, and the capacity of the refrigerant flow channel of the radiator 35 is smaller than the capacity of the refrigerant flow channel of the radiator 36.

Further, the refrigeration cycle apparatus, according to Embodiment 5, includes at least one refrigerant circuit (one refrigerant circuit 16 in this example) configured to circulate refrigerant, and the refrigerant circuit is provided with at least one compressor (compressor 25 in this example), a plurality of radiators (radiators 35 and 36 in this example) configured to transfer heat to the external fluid (indoor air in this example), at least one expansion device (expansion devices 45, 61, and 62 in this example), and at least one evaporator (evaporator 55 in this example). The radiators are arranged in series in the direction of the flow of the external fluid, and the pressures of the radiators differ from each other at the time of heat transfer, and the capacities of the refrigerant flow channels of the radiators differ from each other.

Further, the refrigeration cycle apparatus, according to Embodiment 5, is configured so that the density of the refrigerant in the refrigerant flow channel of the radiator 35 is higher than the density of the refrigerant in the refrigerant flow channel of the radiator 36, and that the capacity of the refrigerant flow channel of the radiator 35 is smaller than the capacity of the refrigerant flow channel of the radiator 36. Thus, in the refrigeration cycle apparatus according to Embodiment 5, the capacity of a radiator is smaller as the density of the refrigerant in the refrigerant flow channel is higher, as in the case of Embodiments 1, 2, and 4.

Note that while the radiators 35 and 36 of Embodiment 5 are arranged in series in the direction of the flow of indoor air sent by the indoor fan 38, the radiators 35 and 36 may be arranged in parallel in the direction of the flow of indoor air sent by a common indoor fan, or may be arranged on respective flows of indoor air, substantially independent from each other, sent by different indoor fans.

Other Embodiments

The present invention can be modified in various manners and is not limited to the embodiments described above.

For example, while refrigeration cycle apparatuses each having two radiators are exemplarily illustrated in the embodiments described above, present invention is applicable to a refrigeration cycle apparatus having three or more radiators. For example, in a refrigeration cycle apparatus having three radiators, when the density of refrigerant differs in the respective refrigerant flow channels of the three radiators, a radiator having refrigerant of a higher density is only required to have a refrigerant flow channel of smaller capacity. Three or more radiators may be provided in parallel or in series to one refrigerant circuit, or may be provided to different refrigerant circuits.

Further, while an air-conditioning apparatus only for room heating and a heat source apparatus only for water heating operation are exemplarily illustrated in the embodiments described above, a refrigerant circuit may be provided with a flow channel switching device such as a four-way valve to enable switching between room heating operation and room cooling operation (water heating operation and water cooling operation).

Further, the respective embodiments or modifications described above may be implemented in a combined manner.

REFERENCE SIGNS LIST

11, 12, 13, 14, 15, 16 refrigerant circuit 21, 22, 23, 24, 25 compressor
31, 32, 33, 34, 35, 36 radiator 37, 41, 42, 43, 44, 45, 61, 62 expansion device 38 indoor fan 51, 52, 53, 54, 55 evaporator 56 outdoor fan 60 water pipe

The invention claimed is:

1. A refrigeration cycle apparatus comprising:
a first refrigerant circuit and a second refrigerant circuit that each circulate a refrigerant of a same composition,
the first refrigerant circuit being provided with a first radiator that condenses the refrigerant to transfer heat to external fluid,
the second refrigerant circuit being provided with a second radiator that transfers heat to the external fluid while allowing the refrigerant to be maintained in a supercritical state,
the first radiator being arranged upstream of the second radiator in a direction of a flow of the external fluid, and
a capacity of a refrigerant flow channel of the second radiator being smaller than a capacity of a refrigerant flow channel of the first radiator.

2. A refrigeration cycle apparatus comprising:
a refrigerant circuit that circulates refrigerant,
the refrigerant circuit being provided with a first radiator that condenses the refrigerant to transfer heat to external fluid, and a second radiator that transfers heat to the external fluid while allowing the refrigerant to be maintained in a supercritical state,
the first radiator being arranged upstream of the second radiator in a direction of a flow of the external fluid, and
a capacity of a refrigerant flow channel of the second radiator being smaller than a capacity of a refrigerant flow channel of the first radiator.

3. The refrigeration cycle apparatus of claim 1, wherein, as the refrigerant, a refrigerant containing R1123 is used.

4. The refrigeration cycle apparatus of claim 2, wherein, as the refrigerant, a refrigerant containing R1123 is used.

5. The refrigeration cycle apparatus of claim 1, wherein the refrigerant flow channel in the second radiator is narrower than the refrigerant flow channel in the first radiator.

6. The refrigeration cycle apparatus of claim 2, wherein the refrigerant flow channel in the second radiator is narrower than the refrigerant flow channel in the first radiator.

* * * * *